United States Patent [19]

Belmont

[11] Patent Number: 5,672,198

[45] Date of Patent: *Sep. 30, 1997

[54] AQUEOUS INKS AND COATINGS CONTAINING MODIFIED CARBON PRODUCTS

[75] Inventor: James A. Belmont, Acton, Mass.

[73] Assignee: Cabot Corporation, Boston, Mass.

[*] Notice: The term of this patent shall not extend beyond the expiration date of Pat. No. 5,571,311.

[21] Appl. No.: 572,542

[22] Filed: Dec. 14, 1995

Related U.S. Application Data

[63] Continuation-in-part of Ser. No. 356,660, Dec. 15, 1994, abandoned, and a continuation-in-part of Ser. No. 356,653, Dec. 15, 1994, Pat. No. 5,554,739.

[51] Int. Cl.⁶ ............................................. C09D 11/02
[52] U.S. Cl. ............................................. 106/20 R; 106/476
[58] Field of Search ............................. 106/20 R, 23 R, 106/476

[56] References Cited

U.S. PATENT DOCUMENTS

| | | | |
|---|---|---|---|
| T860,001 | 3/1969 | Gessler et al. | |
| 2,121,535 | 6/1938 | Amon | 106/423 |
| 2,156,591 | 5/1939 | Jacobson | 106/475 |
| 2,502,254 | 3/1950 | Glassman | 106/476 |
| 2,514,236 | 7/1950 | Glassman | 106/499 |
| 2,625,492 | 1/1953 | Young | 106/20 R |
| 2,793,100 | 5/1957 | Weihe | |
| 2,833,736 | 5/1958 | Glaser | 106/20 R |
| 2,867,540 | 1/1959 | Harris | |
| 3,011,902 | 12/1961 | Jordan | 106/477 |
| 3,025,259 | 3/1962 | Watson et al. | 260/41.5 |
| 3,043,708 | 7/1962 | Watson et al. | 106/476 |
| 3,335,020 | 8/1967 | Aboytes et al. | 106/476 |
| 3,479,300 | 11/1969 | Rivin et al. | 252/430 |
| 3,528,840 | 9/1970 | Aboytes | 106/473 |
| 3,607,813 | 9/1971 | Purcell | 106/20 R |
| 3,674,670 | 7/1972 | Erikson et al. | 428/411.1 |
| 3,686,111 | 8/1972 | Makhlouf et al. | 524/530 |
| 3,846,141 | 11/1974 | Ostergren et al. | 106/22 R |
| 3,876,603 | 4/1975 | Makhlouf | 106/472 |

(List continued on next page.)

FOREIGN PATENT DOCUMENTS

| | | |
|---|---|---|
| A 0006190 | 1/1980 | European Pat. Off. |
| 272127 | 6/1988 | European Pat. Off. |
| 433229 | 6/1991 | European Pat. Off. |
| 0 441 987 | 8/1991 | European Pat. Off. |
| 410152 | 2/1994 | European Pat. Off. |
| 636591 | 2/1995 | European Pat. Off. |
| 1164786 | 10/1958 | France |
| E 72775 | 4/1960 | France |
| 1215895 | 4/1960 | France |
| 1224131 | 4/1960 | France |
| 1331889A | 7/1963 | France |
| 2477593 | 11/1981 | France |
| 2564489 | 11/1985 | France |
| 2607528 | 6/1988 | France |
| 2426266A | 12/1975 | Germany |
| 3170748 | 7/1985 | Germany |
| 59-82467 | 5/1984 | Japan |
| 1-275666 | 11/1989 | Japan |
| 5-271365 | 10/1993 | Japan |
| 5339516 | 12/1993 | Japan |
| 6-025572 | 2/1994 | Japan |
| 6025572 | 2/1994 | Japan |
| 6067421 | 3/1994 | Japan |
| 6073235 | 3/1994 | Japan |
| 862018 | 3/1961 | United Kingdom |
| 1191872 | 5/1970 | United Kingdom |
| WO91/15425 | 10/1991 | WIPO |
| WO92/13983 | 8/1992 | WIPO |

OTHER PUBLICATIONS

J. Am. Chem. Soc. 1992, 114, 5883–5884, no month available.

S. Wolff et al., "The Influence of Modified carbon Blacks on Viscoelastic compound Properties" Kautschuk & Gummi, Kunststoffe 44, Jahrgang, Nr. Oct. 1991, pp. 941–947.

C. Bourdillon, "Immobilization of glucose oxidase on a carbon surface derivatized electrochemical reduction of diazonium salts" J. Electroanal. Chem. 336 (1992) 113–123, (no month available).

S.E. Moschopedis et al., "The Reaction of Diazonium Salts with Bumic Acids and coals: Evidence for Activated Methylene Bridges in Coals and Humic Acids" Fuel 43(4) at pp. 289–298 (1964), (no month available).

Ullmann's Encyclopedia of Industrial Chemistry, vol. A8, 508–509, no date available.

J.B. Donnet et al., "Chimie Superficielle Et Sites Privilégiés Des Charges Fines" Conference presentee aux Journees du Caoutehoue, Conference Internationale des Arts chimiques, 22–23, pp. 5–12, (Jun. 1959).

(List continued on next page.)

Primary Examiner—Helene Klemanski
Attorney, Agent, or Firm—Martha A. Finnegan; James A. Cairns; Michelle B. Lando

[57] ABSTRACT

Aqueous ink compositions are described which include a modified carbon product comprising a carbon having attached at least one organic group that is substituted with an ionic or an ionizable group. A coating composition is also described and comprises water, a binder, and a modified carbon product having at least one organic group attached to carbon wherein the organic group is substituted with an ionic or an ionizable group.

20 Claims, No Drawings

U.S. PATENT DOCUMENTS

| | | | |
|---|---|---|---|
| 4,003,751 | 1/1977 | Carder | 106/20 R |
| 4,006,031 | 2/1977 | Ferch et al. | 106/473 |
| 4,014,833 | 3/1977 | Story | 106/20 R |
| 4,014,844 | 3/1977 | Vidal et al. | 106/472 |
| 4,061,830 | 12/1977 | Greenberg | 428/469 |
| 4,176,361 | 11/1979 | Kawada et al. | 106/22 R |
| 4,204,871 | 5/1980 | Johnson et al. | 106/20 R |
| 4,204,876 | 5/1980 | Bowden | 106/474 |
| 4,290,072 | 9/1981 | Manusukhani | 106/20 R |
| 4,293,394 | 10/1981 | Darlington et al. | 205/524 |
| 4,308,061 | 12/1981 | Iwahashi et al. | 106/22 H |
| 4,328,041 | 5/1982 | Wilson | 106/472 |
| 4,442,256 | 4/1984 | Miller | 524/539 |
| 4,451,597 | 5/1984 | Victorius | 524/39 |
| 4,476,270 | 10/1984 | Brasen et al. | 524/364 |
| 4,478,905 | 10/1984 | Neely, Jr. | 428/324 |
| 4,503,174 | 3/1985 | Vasta | 523/439 |
| 4,503,175 | 3/1985 | Houze et al. | 524/39 |
| 4,525,521 | 6/1985 | Denhartog | 524/517 |
| 4,525,570 | 6/1985 | Blum et al. | 528/75 |
| 4,530,961 | 7/1985 | Nguyen et al. | 106/20 R |
| 4,544,687 | 10/1985 | Schupp et al. | 523/414 |
| 4,555,535 | 11/1985 | Bednarek et al. | 524/40 |
| 4,556,427 | 12/1985 | Lewis | 106/20 R |
| 4,597,794 | 7/1986 | Ohta et al. | 106/22 C |
| 4,605,596 | 8/1986 | Fry | 428/423.3 |
| 4,620,993 | 11/1986 | Suss et al. | 427/407.1 |
| 4,620,994 | 11/1986 | Suss et al. | 427/407.1 |
| 4,650,718 | 3/1987 | Simpson et al. | 428/413 |
| 4,659,770 | 4/1987 | Vasta | 524/553 |
| 4,665,128 | 5/1987 | Cluff et al. | 525/131 |
| 4,680,204 | 7/1987 | Das et al. | 427/407.1 |
| 4,681,811 | 7/1987 | Simpson et al. | 428/413 |
| 4,692,481 | 9/1987 | Kelly | 523/219 |
| 4,710,543 | 12/1987 | Chattha et al. | 525/161 |
| 4,713,427 | 12/1987 | Chattha et al. | 525/110 |
| 4,719,132 | 1/1988 | Porter, Jr. | 427/409 |
| 4,727,100 | 2/1988 | Vasta | 524/40 |
| 4,741,780 | 5/1988 | Atkinson | 106/300 |
| 4,752,532 | 6/1988 | Starka | 428/482 |
| 4,764,430 | 8/1988 | Blackburn et al. | 428/413 |
| 4,770,706 | 9/1988 | Pietsch | 106/24 R |
| 4,789,400 | 12/1988 | Sciodar et al. | 106/22 H |
| 4,798,745 | 1/1989 | Martz et al. | 427/407.1 |
| 4,798,746 | 1/1989 | Claar et al. | 427/407.1 |
| 4,808,656 | 2/1989 | Kania et al. | 524/512 |
| 4,820,751 | 4/1989 | Takeshita et al. | 523/215 |
| 4,840,674 | 6/1989 | Schwarz | 106/22 R |
| 4,853,037 | 8/1989 | Johnson et al. | 106/22 R |
| 4,883,838 | 11/1989 | Jung et al. | 525/119 |
| 4,908,397 | 3/1990 | Barsotti et al. | 523/400 |
| 4,914,148 | 4/1990 | Hille et al. | 524/507 |
| 4,927,868 | 5/1990 | Schimmel et al. | 523/439 |
| 4,975,474 | 12/1990 | Barsotti et al. | 523/400 |
| 4,994,520 | 2/1991 | Mori et al. | 106/20 R |
| 5,008,335 | 4/1991 | Pettit, Jr. | 525/111 |
| 5,017,435 | 5/1991 | Barsotti et al. | 428/502 |
| 5,026,755 | 6/1991 | Kveglis et al. | 524/389 |
| 5,051,464 | 9/1991 | Johnson | 524/555 |
| 5,064,719 | 11/1991 | Den Hartog et al. | 428/411.1 |
| 5,066,733 | 11/1991 | Martz et al. | 524/455 |
| 5,076,843 | 12/1991 | Acitelli et al. | 106/22 R |
| 5,093,391 | 3/1992 | Barsotti et al. | 523/400 |
| 5,093,407 | 3/1992 | Komai et al. | 524/495 |
| 5,100,470 | 3/1992 | Hindagolla et al. | 106/22 H |
| 5,106,417 | 4/1992 | Hauser et al. | 106/20 R |
| 5,109,055 | 4/1992 | Inui et al. | 524/400 |
| 5,114,477 | 5/1992 | Mort et al. | 106/22 H |
| 5,122,552 | 6/1992 | Johnson | 523/454 |
| 5,130,004 | 7/1992 | Johnson et al. | 204/181.7 |
| 5,130,363 | 7/1992 | Scholl et al. | 524/392 |
| 5,141,556 | 8/1992 | Matrick | 106/23 R |
| 5,152,801 | 10/1992 | Altermatt et al. | 106/473 |
| 5,159,009 | 10/1992 | Wolff et al. | 524/495 |
| 5,168,106 | 12/1992 | Babcock et al. | 524/495 |
| 5,173,111 | 12/1992 | Krishnan et al. | 106/20 R |
| 5,179,191 | 1/1993 | Jung et al. | 528/272 |
| 5,182,355 | 1/1993 | Martz et al. | 528/75 |
| 5,184,148 | 2/1993 | Suga et al. | 106/20 R |
| 5,190,582 | 3/1993 | Shinozuka et al. | 106/20 D |
| 5,200,164 | 4/1993 | Medalia et al. | 106/478 |
| 5,204,404 | 4/1993 | Werner, Jr. et al. | 524/501 |
| 5,206,295 | 4/1993 | Harper et al. | 525/207 |
| 5,221,581 | 6/1993 | Palmer | 428/425.8 |
| 5,229,452 | 7/1993 | Green et al. | 524/514 |
| 5,232,974 | 8/1993 | Branan, Jr. et al. | 524/495 |
| 5,236,992 | 8/1993 | Bush | 524/495 |
| 5,242,751 | 9/1993 | Hartman | 428/324 |
| 5,266,361 | 11/1993 | Schwartz et al. | 427/407.1 |
| 5,266,406 | 11/1993 | Den Hartog et al. | 428/423.1 |
| 5,276,097 | 1/1994 | Hoffmann et al. | 525/167 |
| 5,281,261 | 1/1994 | Lin | 106/20 R |
| 5,286,286 | 2/1994 | Winnik et al. | 106/21 A |
| 5,288,788 | 2/1994 | Shieh et al. | 524/495 |
| 5,290,848 | 3/1994 | Palmer et al. | 524/517 |
| 5,302,197 | 4/1994 | Wickramanayke et al. | 106/20 R |
| 5,310,778 | 5/1994 | Shor et al. | 106/20 D |
| 5,314,945 | 5/1994 | Nickle et al. | 524/507 |
| 5,314,953 | 5/1994 | Corcoran et al. | 525/123 |
| 5,319,044 | 6/1994 | Jung et al. | 526/279 |
| 5,320,738 | 6/1994 | Kaufman | 205/317 |
| 5,324,790 | 6/1994 | Manring | 525/329.9 |
| 5,334,650 | 8/1994 | Serdiuk et al. | 524/591 |
| 5,336,716 | 8/1994 | Kappes et al. | 525/23 |
| 5,336,753 | 8/1994 | Jung et al. | 528/335 |
| 5,352,289 | 10/1994 | Weaver et al. | 106/476 |
| 5,356,973 | 10/1994 | Taljan et al. | 524/314 |
| 5,366,828 | 11/1994 | Struthers | 429/101 |
| 5,401,313 | 3/1995 | Supplee et al. | 106/476 |

OTHER PUBLICATIONS

V.A. Garten et al., "Nature of Chemisorptive Mechanisms In Rubber Reinforcement", Commonwealth Scientific and Industrial Research Organ., Div. of Industrial Chem., Melbourne, Australia, pp. 596–609, no date available.

J.W. Watson, "Chemical Aspects of Reinforcement", Compounding Research Dept., Dunlop Research Center, Dunlop Rubber Co., pp. 987–999, no date available.

K. Ohkita et al. "The Reaction of Carbon Black Surface With 2,2–Diphenyl–1–picrylhydrazyl", CAR, vol. 10 No. 5, (Mar. 1972) pp. 631–636.

M.L. Studebaker et al., "Oxygen–Containing Groups on The Surface of Carbon Black", Industrial and Eng. and Chem., vol. 48, No. 1, pp. 162–166, no date avail.

T. Yamaguchi et al., "Novel Carbon Black/Rubber Coupling Agent", Kautschuk and Gummi, Kunststoffe 42, Jahrgang Nr. May, 1989, pp. 403–409.

J.B. Donner et al., "Aroxylic Structure of The Quinone Groups And of The Free Radicals Present On Carbon Black Surfaces", Rev. Gen. Caoutchous Plasticques, vol. 42, No. 3, (1965), pp. 389–392. (w/Abstract), no month.

J.B. Donnet et al., "Radical Reactions And Surface Chemistry of Carbon Black", Bull. Soc. Chim. (1960) (Abstract only), no month available.

RAPRA Abstract 432845: Compounding Heat Resistant Non–Black EPDM Rubber, PPG Industries, Dec. 1990.

RAPRA Abstract 417612, D.C. Edwards, "Review: Polymer-Filler Interactions In Rubber Reinforcement", J. Mat. Sci., vol. 25, No. 10, Oct. 1990, pp. 4175–4185.

Gregory, Peter, "Ink Jet Printing", High-Technology Applications of Organic Colorants, Chapter 9, (1991), no month available.

RAPRA Abstract 403202 D. Siller, "Organotitanate, Zirconate Effect on Elastomers", Rubb. Plast News, vol. 19, No. 24, pp. 14–27, Jun. 1990.

RAPRA Abstract 390600, H. Okamoto, "Application of Coupling Agents To Elastomers", Nippon Gomu Kyokaishi, vol. 62, No. 12, (1989) pp. 819–833, no month.

RAPRA Abstract 394030, P. Flink et al., "Mechanical Properties of Natural Rubber/Grafted Cellulose Fibre Composites", Brit. Polym. J., vol. 22, No. 2, 1990, pp. 147–153, no month available.

Tsubokawa et al., "Grafting Onto Carbon Black Having Few Functional Group" Shikizai Kvokaisha, vol. 66, No. 5, (1993) (Abstract Only), no month available.

R.H. Leach et al., "The Printing Processes", The Printing Ink Manual chapter 2, Fourth Edition, 1988, no month available.

R.H. Leach et al "Gravure Inks", The Printing Ink Manual, chapters 8–10, Fifth Edition (1988), no month available.

N. Tsubokawa, "Functionalization of Black By Surface Grafting of Polymers", Dept. Of Material and Chemical Eng., pp. 417–470, 1992, no month.

"Ink Jet Printing: 1994 Overview and Outlook Supplied", Chapter 7, no date avail.

Andreattola, Ink Jet Ink Technology, pp. 533–534, no date available.

Major, Michael J., "Formulating The Future of Automotive Coatings", Modern Paint and Coatings, pp. 34–36, (1992), no month available.

Greenfield, David, "Fewer Formulation Options Lead to Emphasis on Familiar", Modern Paint and Coatings, pp. 40–42, (1992), no month available.

Schrantz, Joe, "Automotive Coatings", Modern Paint and Coatings pp. 22–31, (1994), no month available.

"Regulations Focus Formulator Attention on Additives", Modern Paint and Coatings, pp. 32–36, (1994), no month available.

Sherrer, Robert, "Coloration of Ink Jet Inks", BLS Ink Jet Printing Conference, Oct. 10–12, (1994), Monterey CA.

Allen, Ross, "Thermal Ink Jet Printing Trends and Advances", BLS Ink Jet Printing Conference, Oct. 10–12, (1994), Monterey, CA.

Schneider, John, "Continuous Ink Jet", BLS Ink Jet Printing Conference Oct. 10–12 (1994) Monterey, CA.

Abstract 388935, R. Mushack, "Light-Colored Fillers In Polymers", Gummi Fas. Kinst., vol. 42, No. 11, (1989), pp. 584–592, no month available.

Abstract 301034, J.Y. Germain et al., "Carbon Black Is Better With Silica" Rubb. World, vol. 193, No. 1, pp. 51–54, Oct. 1985.

Abstract 343229, "White And Black Fillers For Rubber Compounds", Ind.d. Gomma, vol. 30, No. 12, pp. 23–54, Dec. 1986.

Abstract 177481, L. Corbelli, "Ethylene-Propylene Rubbers", London Applied Science Publishers Ltd., (1981) Chapter 4, pp. 87–129, no month.

Abstract 105623, G. Sugerman et al., "Putting Performance Into Thermosets With Titanium Coupling Agents", Cleveland, Ohio, pp. 106–113, Oct. 1976.

Abstract 056893, M.W. Ranney et al., "Applications For Silane Coupling Agents In The Automotive Industry", Kaut. U. Gummi Kunst., vol. 28, No. 10, pp. 597–608, Oct. 1975.

Abstract 002608 H.E Haxo et al., "Ground Rice Hull Ash As A Filler For Rubber", Philadelphia, Paper No. 8, (1974), pp. 41, Preprint .012, no month.

Abstract 000937, G.M. Cameron et al., "Reduction of Hear Build-Up In Mineral-Filled Elastomers Through The Use Of Silane Coupling Agents", Gothenburg, (44) (1973) Ser. Sec. 012, no month available.

Abstract 86056110, "Putting Performance Into Thermosets With Titanium Coupling Agents", G. Sugerman et al., High Performance Plast. National Tech. Conference, Soc. Plast. Eng, 1976, no month available.

H. Zoheidi et al "Role of Oxygen Surface Groups In Catalysts of Hydrogasification of Carbon Black By Potassium Carbonate," Carbon vol. 25, No. 6, pp. 809–819, Mar. 1987.

J.D. Roberts et al. "Basic Principles of Organic Chemistry," p. 1080, no date available.

Derwent Publications Ltd., Database WPI Week 8002, AN 80–03330C; SU,A,659 523, Apr. 1979, Abstract.

Derwent Publications Ltd., Database WPI Week 9423, AN 94–189154; JP 61–28517A, May 1994, Abstract.

Derwent Publications Ltd., Database WPI Week 9524, AN 95–183086; JP,A,07 102 116, Apr. 1995, Abstract.

Patent Abstracts of Japan, vol. 95, No. 4, JP,A,07 102116, Apr. 1995, Abstract.

Derwent Publications Ltd., Database WPI Week 8651, AN 86–335147; JP 61–250 042, Nov. 1986, Abstract.

PCT International Search Report, Application No. PCT/US 95/16195 Mailing Date: Apr. 19, 1996.

PCT International Search Report, Application No. PCT/US 95/16452 Mailing Date: Apr. 17, 1996.

PCT International Search Report, Application No. PCT/US 95/01154, Mailing Date: Apr. 29, 1996.

PCT International search Report, Application No. PCT/US 95/16281, Mailing Date: Apr. 26, 1996.

Derwent Publications Ltd. Database WPI Week 8214, AN 82–28019E; SU,A,834 062, May 1981, Abstract.

AQUEOUS INKS AND COATINGS CONTAINING MODIFIED CARBON PRODUCTS

This application is a continuation-in-part of U.S. patent application Ser. No. 08/356,660 now abandoned and Ser. No. 08/356,653, now U.S. Pat. No. 5,554,739 both filed Dec. 15, 1994, the disclosures of which are herein incorporated by reference.

FIELD OF THE INVENTION

This invention relates to aqueous inks and coatings which contain a modified carbon product.

BACKGROUND OF THE INVENTION

There are various classifications of inks used presently. These categories include printing inks, ultraviolet cure inks, ball-point inks, and stamp pad or marking inks. Fundamentally, inks may be composed of four major material categories. They are colorants, vehicles or varnishes, additives, and solvents.

In more detail, colorants, which include pigments, toners and dyes, provide the color contrast with the substrate. Vehicles or varnishes act as carriers for the colorants during the printing operation. Upon drying, the vehicles bind the colorants to the substrate. Additives influence the printability, film characteristics, drying speed, and end-use properties. Finally, solvents, besides participating in formation of the vehicles, are used to reduce ink viscosity and adjust drying ease and resin capability. Generally, ingredients from these four classes are weighed, mixed, and ground (i.e., dispersed) together, or separately, according to desired formulas.

Presently, predominant black pigments are carbon blacks such as furnace blacks which are used as the colorants either in dry, powdered form, a flushed paste, or liquid concentrate form. The flush paste and liquid concentrate forms are more economical since they require a minimum of dispersing effort. Generally, the form of the colorant influences the hue, permanency, bulk, opacity, gloss, rheology, end use, and print quality.

Generally, inks can be applied by letter press, lithographic, flexographic, gravure, silk screen, stencil, duplicating, and electrostatic. Inks thus can be found in such end uses as news, publication, commercial, folding carton, book, corrugated box, paper bag, wrapper, label, metal container, plastic container, plastic film, foil, laminating, food insert, sanitary paper, textile and the like. McGraw-Hill's *Encyclopedia of Science and Technology*, Vol. 7, pgs. 159–164, provides further details of the types of inks available and their uses, all of which is incorporated herein by reference.

Even with the inks commercially available, there is still a need to provide inks which may be more readily prepared.

Coatings are used for decorative, protective, and functional treatments of many kinds of surfaces. These surfaces include, coils, metals, appliances, furniture, hardboard, lumber and plywood, marine, maintenance, automobile, cans, and paperboard. Some coatings, such as those on undersea pipelines, are for protective purposes. Others, such as exterior automobile coatings, fulfill both decorative and protective functions. Still others provide friction control on boat decks or car seats. Some coatings control the fouling of ship bottoms, others protect food and beverages in cans. Silicon chips, printed circuit panels, coatings on waveguide fibers for signal transmission, and magnetic coatings on video tapes and computer disks are among many so-called hi-tech applications for coatings.

Each year, tens of thousands of coating types are manufactured. In general, they are composed of one or more binders, for example resins or polymers, and at least one solvent, one or more pigments, and optionally several additives. Most coatings are manufactured and applied as liquids and are converted to "solid" films after application to the substrate.

Pigments and coatings provide opacity and color. Pigment content governs the gloss of the final film and can have important effects on its mechanical properties. Some pigments even inhibit corrosion. Further, pigments affect the viscosity and enhance the application properties of the coating. An important variable determining the properties of pigments is their particle size and particle-size distribution. Pigment manufacturing processes are designed to afford the particle size and particle-size distribution that provide the best compromise of particles for that pigment. In manufacturing coatings, it is desirable to disperse the pigment in such a way as to achieve a stable dispersion where most, if not all, of the pigment particles are separated into the individual particles designed into the product by the pigment manufacturer. The dispersion of pigment involves wetting, separation, and stabilization.

There are three categories of vehicles: those in which the binder is soluble in water, those in which it is colloidally dispersed, and those in which it is emulsified to form a latex. Surface coating compositions are usually more or less viscous liquids with three based components: a film-forming substance or combination of substances called the binder, a pigment or combination of pigments, and a volatile liquid. The combination of binder and volatile liquid is called the vehicle which may be a solution or a dispersion of fine binder particles in a non-solvent. Pigments are finely divided, insoluble, solid particles dispersed in the coating vehicle and distributed throughout the binder in the final film. Surfactants are used as pigment dispersants. The components and manufacturing of aqueous coatings are further discussed in the *Concised Encyclopedia of Polymers, Science and Engineering*, pgs. 160–171 (1990), which is incorporated herein by reference.

There is still a need for an aqueous coating that may be more readily prepared in both aqueous inks and coatings. The solvent is, or contains, water.

SUMMARY OF THE INVENTION

Accordingly, the present invention relates to an aqueous ink composition or aqueous coating composition comprising water and a modified carbon product comprising a carbon having attached an organic group. The organic group is substituted with an ionic or an ionizable group. Carbon, as used herein, is capable of reacting with a diazonium salt to form the above-mentioned modified carbon product. The carbon may be of the crystalline or amorphous type. Examples include, but are not limited to, graphite, carbon black, vitreous carbon, activated charcoal, activated carbon, and mixtures thereof. Finely divided forms of the above are preferred.

The organic group comprises a) at least one aromatic group and b) at least one ionic group, at least one ionizable group, or a mixture of an ionic group and an ionizable group. The organic group having an aromatic group is directly attached to the carbon by the aromatic group.

Alternatively, the organic group of the modified carbon product comprises a) at least one $C_1$–$C_{12}$ substituted or unsubstituted alkyl group and b) at least one ionic group, at least one ionizable group, or a mixture of an ionic group and an ionizable group.

The aqueous inks and coatings of this invention offer desirable dispersion stability, print quality, and image optical density.

The description which follows sets out additional features and advantages of the invention. These functions will be apparent from that description or may be learned by practice of the invention as described. The objectives and other advantages will be realized and attained by the processes, products, and compositions particularly pointed out in the description below and the appended claims.

DETAILED DESCRIPTION

Carbon, as used herein, is capable of reacting with a diazonium salt to form the above-mentioned modified carbon product. The carbon may be of the crystalline or amorphous type. Examples include, but are not limited to, graphite, carbon black, vitreous carbon, activated charcoal, activated carbon, and mixtures thereof. Finely divided forms of the above are preferred.

The present invention relates to aqueous ink and coating compositions comprising an aqueous vehicle and the modified carbon product. In contrast to conventional carbon pigments, the modified carbon products for use in the ink or coating of the present invention are not difficult to disperse in an aqueous vehicle. The modified carbon products do not necessarily require a conventional milling process, nor are dispersants necessarily needed to attain a usable ink or coating. Preferably, the modified carbon products only require low shear stirring or mixing to readily disperse the pigment in water.

The carbon products may be prepared by reacting carbon as defined above, with a diazonium salt in a liquid reaction medium to attach at least one organic group to the surface of the carbon. Preferred reaction media include water, any medium containing water, and any medium containing alcohol. Water is the most preferred medium. These modified carbon products, wherein the carbon is carbon black, and various methods for their preparation are described in U.S. patent application Ser. No. 08/356,660 entitled "Reaction of Carbon Black with Diazonium Salts, Resultant Carbon Black Products and Their Uses," filed Dec. 15, 1994, now abandoned and its continuation-in-part application, filed concurrently with this application, both of which are incorporated herein by reference. These modified carbon products, wherein the carbon is not carbon black, and various methods for their preparation are described in patent application Ser. No. 08/356,653 entitled "Reaction of Carbon Materials With Diazonium Salts and Resultant Carbon Products," filed Dec. 15, 1994, now U.S. Pat. No. 5,554,739 also incorporated herein by reference.

To prepare the above modified carbon products, the diazonium salt need only be sufficiently stable to allow reaction with the carbon. Thus, that reaction can be carried out with some diazonium salts otherwise considered to be unstable and subject to decomposition. Some decomposition processes may compete with the reaction between the carbon and the diazonium salt and may reduce the total number of organic groups attached to the carbon. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

Carbon black can be reacted with a diazonium salt when present as a dilute, easily stirred, aqueous slurry, or in the presence of the proper amount of water for carbon black pellet formation. If desired, carbon black pellets may be formed utilizing a conventional pelletizing technology. Other carbon can be similarly reacted with the diazonium salt. In addition, when modified carbon products utilizing carbon other than carbon black for used in aqueous inks and coatings are used, the carbon should preferably be ground to a fine particle size before reaction with the diazonium salt to prevent unwanted precipitation in the ink. The organic groups which may be attached to the carbon are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group or a $C_1$–$C_{12}$ substituted or unsubstituted alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group or the alkyl group of the organic group is directly attached to the carbon. The aromatic group may be further substituted or unsubstituted, for example, with alkyl groups. The $C_1$–$C_{12}$ alkyl group may be branched or unbranched and is preferably ethyl. More preferably, the organic group is a phenyl or a naphthyl group and the acidic group is a sulfonic acid group, a sulfinic acid group, a phosphonic acid group, or a carboxylic acid group. Examples include —COOH, —$SO_3H$ and —$PO_3H_2$, —$SO_2NH_2$, —$SO_2NHCOR$, and their salts, for example —COONa, —COOK, —COO$^-$ $NR_4^+$, —$SO_3Na$, —$HPO_3Na$, —$SO_3^-NR_4^+$, and $PO_3Na_2$, where R is an alkyl or phenyl group. Particularly preferred ionizable substituents are —COOH and —$SO_3H$ and their sodium and potassium salts.

Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof.

Specific organic groups having an ionizable functional group forming an anion are p-sulfophenyl, 4-hydroxy-3-sulfophenyl, and 2-sulfoethyl.

Amines represent examples of ionizable functional groups that form cationic groups and can be attached to the same organic groups as discussed above for the ionizable groups which form anions. For example, amines may be protonated to form ammonium groups in acidic media. Preferably, an organic group having an amine substituent has a pKb of less than 5. Quaternary ammonium groups (—$NR_3^+$) and quaternary phosphonium groups (—$PR_3^+$) also represent examples of cationic groups and can be attached to the same organic groups as discussed above for the ionizable groups which form anions. Preferably, the organic group contains an aromatic group such as a phenyl or a naphthyl group and a quaternary ammonium or a quaternary phosphonium group. The aromatic group is preferably directly attached to the carbon. Quaternized cyclic amines, and quaternized aromatic amines, can also be used as the organic group. Thus, N-substituted pyridinium compounds, such as N-methyl-pyridyl, can be used in this regard. Examples of organic groups include, but are not limited to, $(C_5H_4N)C_2H_5^+$, $C_6H_4(NC_5H_5)^+$, $C_6H_4COCH_2N(CH_3)_3^+$, $C_6H_4COCH_2(NC_5H_5)^+$, $(C_5H_4N)CH_3^+$, and $C_6H_4CH_2N(CH_3)_3^+$.

An advantage of the modified carbon products having an attached organic group substituted with an ionic or an ionizable group is that the modified carbon products may have increased water dispersibility relative to the corresponding untreated carbon. In general, water dispersibility of the modified carbon products increases with the number of organic groups attached to the carbon having an ionizable group or the number of ionizable groups attached to a given organic group. Thus, increasing the number of ionizable groups associated with the modified carbon products should increase their water dispersibility and permits control of the water dispersibility to a desired level. It can be noted that the water dispersibility of modified carbon products containing an amine as the organic group attached to the carbon may be increased by acidifying the aqueous vehicle.

Because the water dispersibility of the modified carbon products depends to some extent on charge stabilization, it is preferable that the ionic strength of the aqueous medium be less than 0.1 molar. More preferably, the ionic strength is less than 0.01 molar. It is preferred that the modified carbon product of the present invention contain no by-products or salts.

When water dispersible modified carbon products of the present invention are prepared, it is preferred that the ionic or ionizable groups be ionized in the reaction medium. The resulting product dispersion or slurry may be used as is or diluted prior to use. Alternatively, the modified carbon products may be dried by techniques used for conventional carbon blacks. These techniques include, but are not limited to, drying in ovens and rotary kilns. Overdrying, however, may cause a loss in the degree of water dispersibility. In the event that the modified carbon products above do not disperse in the aqueous vehicle as readily as desired, the modified carbon products may be dispersed using conventionally known techniques such as milling or grinding.

The modified carbon black products of this invention are particularly useful in aqueous ink formulations. Thus, the invention provides an improved ink composition comprising water and a modified carbon product according to the invention. Other known aqueous ink additives may be incorporated into the aqueous ink formulation.

In general, an ink may consist of four basic components: (1) a colorant or pigment, (2) a vehicle or varnish which functions as a carrier during printing, (3) additives to improve printability drying, and the like, and (4) solvents to adjust viscosity, drying and the compatibility of the other ink components. For a general discussion on the properties, preparation and uses of aqueous inks, see *The Printing Manual*, 5th Ed., Leach et al, Eds. (Chapman and Hall, 1993), incorporated herein by references. Various aqueous ink compositions are also disclosed, for example, in U.S. Pat. Nos. 2,833,736, 3,607,813, 4,104,833, 4,308,061, 4,770,706, and 5,026,755, all incorporated herein by reference.

The modified carbon products of the invention, either as predispersion or as a solid, can be incorporated into an aqueous ink formulation using standard techniques. Use of a water dispersible modified carbon product of the invention provides a significant advantage and cost savings by reducing or eliminating the milling steps generally used with other conventional carbon blacks.

Flexographic inks represent a group of aqueous ink compositions. Flexographic inks generally include a colorant, a binder, and a solvent. The modified carbon products of the invention are useful as flexographic ink colorants. Example 3 shows the use of a modified carbon product of the invention in an aqueous flexographic ink formulation.

The modified carbon products of the invention can be used in aqueous news inks. For example, an aqueous news ink composition may comprise water, the modified carbon products of the invention, a resin and conventional additives such as antifoam additives or a surfactant.

The modified carbon products of this invention may also be used in aqueous coating compositions such as paints or finishes. Thus, an embodiment of the invention is an improved aqueous coating composition comprising water, resin and a modified carbon product according to the invention. Other known aqueous coating additives may be incorporated the aqueous coating composition. See, for example, McGraw-Hill Encyclopedia of Science & Technology, 5th Ed. (McGraw-Hill, 1982), incorporated herein by reference. See also U.S. Pat. Nos. 5,051,464, 5,319,044, 5,204,404, 5,051,464, 4,692,481, 5,356,973, 5,314,945, 5,266,406, and 5,266,361, all incorporated herein by reference.

The modified carbon products of the invention, either as a predispersion or as a solid, can be incorporated into an aqueous coating composition using standard techniques. Use of a water dispersible modified carbon product provides a significant advantage and cost savings by reducing or eliminating the milling steps generally used with other conventional carbon blacks. Some of the Examples below show the use of modified carbon products according to the invention in aqueous automotive topcoat formulations.

An aqueous ink or coating containing an aqueous vehicle and stably dispersed modified carbon product as pigment can be formed with a minimum of components and processing steps when the above carbon products are utilized. Such an ink or coating may be used for a variety of uses. Preferably, in aqueous inks and coatings of the present invention, the modified carbon products are present in an amount of less than or equal to 20% by weight of the ink or coating. It is also within the bounds of the present invention to use an aqueous ink or coating formulation containing a mixture of unmodified carbon with the modified carbon products of the present invention. Common additives such as those discussed below may be added to the dispersion to further improve the properties of the aqueous ink or coating.

EXAMPLES

Analytical Methods

BET nitrogen surface areas were obtained according to ASTM D-4820 for surface area measurements. DBPA data were obtained according to ASTM D-2414.

Volatile content was determined as follows. A carbon black sample was dried to constant weight at 125° C. A 45mL sample of the dry carbon black was placed in a covered 50 mL crucible that had been dried at 950° C. and heated in a muffle furnace for 7 minutes at 950° C. The volatile content is expressed as the percentage of weight lost by the carbon sample.

The following procedure was used in various Examples below to determine the aqueous residue of carbon black products according to this invention and untreated carbon blacks. The carbon black product (5 g) was shaken with 45 g of water for 5 minutes. The resulting dispersion was poured through a screen and rinsed with water until the washings were colorless. A 325 mesh screen was used unless indicated otherwise. After drying the screen, the weight of residue on the screen was determined and expressed as a percentage of the carbon black product used in the test.

Example 1

Preparation of a carbon black product with a preformed diazonium salt in a pin pelletizer This example shows another method for the preparation of a carbon black product of the present invention. A pin pelletizer was charged with 400 g of a fluffy carbon black with a surface area of 80 m²/g and a DBPA of 85 ml/100 g. A cold suspension of 4-sulfobenzenediazonium hydroxide inner salt prepared from 27.1 g of the sodium salt of sulfanilic acid, 10.32 g of sodium nitrite, 29.0 g of concentrated HCl and 293.5 g of water and was added to the pelletizer. After pelletizing for 2 minutes, the sample was removed and dried at 115° C. to constant weight. The product had a 325 mesh residue of 0.1%, compared to 81% for the unreacted carbon black. Soxhlet extraction with ethanol overnight gave a carbon black product containing 1.1% sulfur, compared against 0.8% for the untreated carbon black. This shows that 27% of the p-$C_6H_4SO_3^-$ groups were attached to the carbon black product. Therefore, the carbon black product had 0.09 mmol/g of attached p-$C_6H_4SO_3^-$ groups.

Example 2

Preparation of a carbon black product with a diazonium salt generated in situ

This example illustrates another method for the preparation of a carbon black product of the present invention. A fluffy carbon black with a surface area of 560 m²/g, a DBPA of 90 ml/100 g and a volatile content of 9.5% was used. Fifty grams of the fluffy carbon black were added to a solution of 8.83 g of sulfanilic acid dissolved in 420 g of water. The resulting suspension was cooled to 30° C. and 4.6 g of concentrated nitric acid was added. An aqueous solution containing 3.51 g of sodium nitrite was then added gradually with stirring, forming 4-sulfobenzenediazonium hydroxide inner salt in situ, which reacts with the fluffy carbon black. The resulting product was dried in an oven at 125° C., leaving the carbon black product. The product had a 325 mesh residue of 0.1%, compared to 6% for the unreacted carbon black. The carbon black product contained 1.97% sulfur after Soxhlet extraction with ethanol overnight, compared to 0.24% sulfur for the untreated fluffy carbon black. This corresponds to attaching 53% of the p-$C_6H_4SO_3^-$ groups to the carbon black product. Therefore, the carbon black product had 0.54 mmol/g of attached p-$C_6H_4SO_3^-$ groups.

Example 3

Use of a carbon black product in the preparation of an aqueous ink

This example illustrates the advantages of using a carbon black product of the present invention in an aqueous ink formulation. Ink composition A was prepared by adding 3.13 parts of the carbon black product of Example 1 to a vehicle made by mixing 2.92 parts JONCRYL 61LV resin, 0.21 parts isopropanol, 0.31 parts ARROWFLEX defoamer, 7.29 parts JONCRYL 89 resin and 6.98 parts water, and shaking the composition for 10 minutes on a paint shaker. The table below shows the 635 mesh residue level.

JONCRYL is a registered trademark for resins produced and sold by SC Johnson Polymer, Racine, Wis. ARROWFLEX is a registered trademark for defoamers produced and sold by Witco, New York, N.Y.

Ink composition B was prepared by grinding a mixture of 120 parts of the carbon black product used in Example 1, 112 parts of JONCRYL 61LV resin, 8 parts of isopropanol, 4 parts of ARROWFLEX defoamer, 156 parts of water and 400 g of grinding media. In order to check the grind level, samples were periodically let down to composition C that contained 15.0 parts carbon black product, 14.0 parts JONCRYL 61LV resin, 1.0 parts isopropanol, 1.7 parts ARROWFLEX DEFOAMER, 35.1 parts Joncryl 89 and 33.4 parts water.

Ink composition D was prepared by grinding a mixture of 120 parts of the untreated carbon black used in Example 1, 112 parts of JONCRYL 61LV resin, 8 parts of isopropanol, 4 parts of ARROWFLEX defoamer, 156 parts of water and 400 g of grinding media. In order to check the grind level, samples were periodically let down to composition E that contained 15.0 parts carbon black product, 14.0 parts JONCRYL 61LV resin, 1.0 parts isopropanol, 1.7 parts ARROWFLEX defoamer, 35.1 parts JONCRYL 89 resin and 33.4 parts water.

The residues from ink compositions A, C and E as a function of grinding time are provided in the following table, and clearly show that a carbon black product of the present invention disperses more readily than the corresponding unreacted carbon black in these aqueous inks.

| Dispersion time | Ink A 635 Mesh Residue, % | Ink C 635 Mesh Residue, % | Ink E 635 Mesh Residue, % |
| --- | --- | --- | --- |
| 10 Minutes shaking | 2.6 | — | — |
| 20 Minutes Ball Mill | — | 0.3 | — |
| 40 Minutes Ball Mill | — | 0.2 | — |
| 1 Hour Ball Mill | — | 0.02 | about 100 |
| 2 Hours Ball Mill | — | — | 10.8 |
| 3 Hours Ball Mill | — | — | 5.8 |
| 4 Hours Ball Mill | — | — | 0.9 |
| 10 Hours Ball Mill | — | — | 0.5 |
| 14 Hours Ball Mill | — | — | 0.3 |
| 15 Hours Ball Mill | — | — | 1.0 |
| 16 Hours Ball Mill | — | — | 1.0 |

Example 4

Use of a carbon black product in the preparation of an aqueous coating

This example shows that carbon black products of the present invention are useful for the preparation of aqueous coatings. The carbon black product from Example 2 (10 g) was dispersed in 90 g of water by stirring for 10 minutes. Coating composition A was prepared by stirring 4.3 g of this dispersion into a mixture of 7.93 g of CARGILL 17-7240 acrylic resin, 0.80 g of dimethylethanolamine (DMEA), 19.57 g water, 0.37 g SURFYNOL CT136 surfactant, 1.32 g CARGILL 23-2347 melamine resin, 0.53 g ethylene glycol monobutyl ether and 0.075 g BYK-306 surfactant. CARGILL 17-7240 acrylic resin and CARGILL 23-2347 melamine resin are available from Cargill Inc., Minneapolis, Minn. SURFYNOL CT136 is a registered trademark for surfactants produced and sold by Air Products and Chemicals, Inc., Allentown, Pa. BYK-306 is a registered trademark for surfactants produced and sold by BYK-Chemie USA, Wallingford.

A millbase was prepared by grinding an oxidized carbon black product (15 g) with a surface area of 560 m2/g, a DBPA of 80 ml/100 g and a volatile content of 9% in a mixture of 74.6 g of CARGILL 17-7240 acrylic resin, 9.53 g DMEA, 236.5 g water and 16.35 g CT-136 surfactant until its mean volume particle size was 0.18 microns. Comparative coating composition B was prepared by mixing 24.4 g of this millbase with a mixture of 17.51 g CARGILL 17-7240 acrylic resin, 1.74 g DMEA, 50.56 g water, 3.97 g CARGILL 23-2347 melamine resin, 1.59 g ethylene glycol monobutyl ether and 0.23 g BYK-306 surfactant.

Glossy lenetta paper coated with compositions A and B was dried at 350° F. for 10 minutes. A clear coat was applied, and the samples were dried again. The paper coated with composition A had Hunter L, a, b values of 1.0, 0.01 and 0.03, respectively, compared to 1.1, 0.01 and −0.06, respectively for the paper coated with comparative composition B.

Example 5

Preparation of a carbon black product and its use in an aqueous coating

This example illustrates the preparation of a carbon black product of the present invention and the use of this carbon black product in an aqueous coating. A carbon black (200 g) with a CTAB surface area of 350 m²/g and a DBPA of 120 ml/100 g was added to a stirred solution of 42.4 g sulfanilic acid in 2800 g of water. Nitrogen dioxide (25.5 g) was dissolved in 100 g of cold water and added to the carbon black product suspension. Bubbles were released. 4-Sulfobenzenediazonium hydroxide inner salt was formed in situ, which reacted with the carbon black. After stirring for one hour, 5 g of additional $NO_2$ was added directly to the carbon black dispersion. The dispersion was stirred for an additional 15 minutes, and left overnight. The resulting carbon black product was recovered by drying the dispersion in an oven at 130° C.

A dispersion of this carbon black product was prepared by stirring 10 g of the carbon black product in 90 g of water. Coating composition C was prepared by stirring 4.3 g of this dispersion into a mixture of 7.53 g of CARGILL 17-7240 acrylic resin, 0.80 g of DMEA, 19.57 g water, 0.37 g SURFYNOL CT136 surfactant, 1.32 g CARGILL 23-2347 melamine resin, 0.53 g ethylene glycol monobutyl ether and 0.075 g BYK-306 surfactant.

A millbase was prepared by grinding (in an attritor) an oxidized carbon black product (15 g) with a surface area of 560 m²/g, a DBPA of 91 ml/100 g and a volatile content of 9.5% in a mixture of 74.6 g of CARGILL 17-7240 acrylic resin, 9.53 g DMEA, 236.5 g water and 16.35 g SURFYNOL CT-136 surfactant for 24 hours. Comparative coating composition D was prepared by mixing 24.4 g of this millbase with a mixture of 17.51 g CARGILL 17-7240 acrylic resin, 1.74 g DMEA, 50.56 g water, 3.97 g CARGILL 23-2347 melamine resin, 1.59 g ethylene glycol monobutyl ether and 0.23 g BYK-306 surfactant.

Glossy lenetta paper coated with compositions A and B was dried at 350° F. for 10 minutes. A clear coat was applied, and the samples were dried again. The paper coated with composition C had Hunter L, a, and b values of 1.0, 0.01 and 0.03, respectively, compared to 1.1, 0.01 and −0.06, respectively for the paper coated with comparative composition D.

What is claimed is:

1. An aqueous ink composition comprising water and a modified carbon product having at least one organic group attached to the carbon wherein the organic group is substituted with an ionic or an ionizable group.

2. The aqueous ink composition of claim 1 wherein the ionic or ionizable group is a sulfonic acid group or a salt thereof, a sulfinic acid group or a salt thereof, a carboxylic acid group or a salt thereof, a phosphonic acid group or a salt thereof, or a quaternary ammonium group.

3. The aqueous ink composition of claim 1 wherein the organic group is a substituted or unsubstituted sulfophenyl group or a salt thereof, or the organic group is a substituted or unsubstituted (polysulfo)phenyl group or a salt thereof.

4. The aqueous ink composition of claim 1 wherein the organic group is a substituted or unsubstituted sulfonaphthyl group or a salt thereof, or the organic group is a substituted or unsubstituted (polysulfo)naphthyl group or a salt thereof.

5. The aqueous ink composition of claim 3 wherein the organic group is a substituted or unsubstituted p-sulfophenyl or a salt thereof.

6. The aqueous ink composition of claim 5 wherein the organic group is $p-C_6H_4SO_3Na$.

7. The aqueous ink composition of claim 1, wherein said carbon is carbon black, graphite, vitreous carbon, finely-divided carbon, activated carbon, activated charcoal, or mixtures thereof.

8. The aqueous ink composition of claim 7 wherein said carbon is carbon black.

9. An aqueous coating composition comprising water, a binder, and a modified carbon product having at least one organic group attached to carbon wherein the organic group is substituted with an ionic or an ionizable group.

10. The aqueous coating composition of claim 9 wherein the ionic or ionizable group is a sulfonic acid group or a salt thereof, a sulfinic acid group or a salt thereof, a carboxylic acid group or a salt thereof, a phosphonic acid group or a salt thereof, or a quaternary ammonium group.

11. The aqueous coating composition of claim 9 wherein the organic group is a substituted or unsubstituted sulfophenyl group or a salt thereof, or the organic group is a substituted or unsubstituted (polysulfo)phenyl group or a salt thereof.

12. The aqueous coating composition of claim 9 wherein the organic group is a substituted or unsubstituted sulfonaphthyl group or a salt thereof, or the organic group is a substituted or unsubstituted (polysulfo)naphthyl group or a salt thereof.

13. The aqueous coating composition of claim 11 wherein the organic group is p-sulfophenyl or a salt thereof.

14. The aqueous coating composition of claim 13 wherein the organic group is $p-C_6H_4SO_3Na$.

15. The aqueous coating composition of claim 9 wherein said carbon is carbon black, graphite, vitreous carbon, finely-divided carbon, activated carbon, activated charcoal, or mixtures thereof.

16. The aqueous coating composition of claim 15 wherein said carbon is carbon black.

17. The aqueous ink composition of claim 1, wherein said organic group comprises at least one aromatic group, wherein said at least one aromatic group is directly attached to the carbon.

18. The aqueous ink composition of claim 1, wherein said organic group comprises at least one $C_1-C_{12}$ alkyl group, wherein said at least one alkyl group is directly attached to the carbon.

19. The aqueous coating composition of claim 9, wherein said organic group comprises at least one aromatic group, wherein said at least one aromatic group is directly attached to the carbon.

20. The aqueous coating composition of claim 9, wherein said organic group comprises at least one $C_1-C_{12}$ alkyl group, wherein said at least one alkyl group is directly attached to the carbon.

* * * * *